United States Patent Office 2,743,271
Patented Apr. 24, 1956

2,743,271

OPTICALLY ACTIVE ALKALOIDAL SALTS OF ETIENOYLPYRUVIC ACIDS

Glen E. Arth, Cranford, and Robert M. Lukes, Nixon, N. J., assignors to Merck & Co., Inc., Rahway, N. J., a corporation of New Jersey No Drawing. Application September 17, 1952, Serial No. 310,136

11 Claims. (Cl. 260—239.55)

This invention relates to novel processes for the resolution of racemic steroid compounds. More particularly, it is concerned with the preparation of the diastereoisomeric forms of dl-11-keto progesterone. Specifically, it is concerned with the preparation of novel optically active salts of $\Delta^5$-3-ethylenedioxy-11-keto-etienoylpyruvic acid, and a method of resolving dl-$\Delta^5$-3-ethylenedioxy-11-keto-etienoylpyruvic acid.

The copending application, Serial No. 310,133, filed September 17, 1952, describes the final steps in the preparation of dl-11-keto progesterone by total synthesis.

It is an object of our present invention to provide a process for the preparation of the diastereoisomeric forms of dl-11-keto progesterone.

It is a further object of our invention to provide novel optically active salts of $\Delta^5$-3-ethylenedioxy-11-keto-etienoylpyruvic acid. An additional object is to provide a process for the separation of the optically active salts of dl-$\Delta^5$-3-ethylenedioxy-11-keto-etienoylpyruvic acid.

Other objects will be apparent from the detailed description of our invention hereinafter provided.

In accordance with the present invention, it is found that a derivative of dl-11-keto-progesterone, namely, dl-$\Delta^5$-3-ethylenedioxy-11-keto-etienoylpyruvic acid, reacts with optically active organic bases to form a mixture of the diastereoisomeric salts which can be separated by fractional crystallization. Thus, upon intimately contacting the racemic steroid compound with an optically active base in a suitable solvent medium, the acidic compound reacts with the base to form a mixture of the d and l salts which can be separated by fractional crystallization from suitable solvents.

Although any of the optically active organic bases can be used in the process of our invention, we have found that alkaloid bases such as strychnine, brucine, and ephedrine are particularly valuable in carrying out our invention, since the resulting alkaloid salts of the d and l forms of $\Delta^5$-3-ethylenedioxy-11-keto-etienoylpyruvic acid are most readily separated by crystallization from common organic solvents. Thus, the resolution of the racemic steroid is conveniently accomplished by fractionally crystallizing the strychnine salts of the racemic steroid. This separation can be effected for example by first preparing a crystalline mixture of the d and l strychnine salts by reacting $\Delta^5$-3-ethylenedioxy-11-keto-etienoylpyruvic acid with strychnine in hot acetone. Upon cooling, the acetone solution deposits a crystalline mixture consisting of the d and l strychnine salts. This mixture of salts is then dissolved in hot ethyl acetate. When the resulting ethyl acetate solution is cooled, the strychnine salt of d-$\Delta^5$-3-ethylenedioxy-11-keto-etienoylpyruvic acid precipitates and can be recovered from the solution by filtration. The strychnine salt of l-$\Delta^5$-3-ethylenedioxy-11-keto-etienoylpyruvic acid can be recovered from the mother liquors by concentration of the mother liquors and recrystallization of the resulting residue. If desired, the d and l strychnine salts so obtained can be purified further by recrystallization from suitable solvents.

The d and l isomers of $\Delta^5$-3-ethylenedioxy-11-keto-etienoylpyruvic acid are readily obtained by treating the separated salts with acid in aqueous solution, and extracting the resulting solution with a water immiscible solvent for the acidic steroid, such as ether.

The d and l forms of the etienoylpyruvic acid compound can then be converted to the d and l forms of $\Delta^5$-3-ethylenedioxy-11,20-diketopregnene by alkaline hydrolysis. This is most conveniently accomplished by reacting the etienoylpyruvic acid compound with an alkali such as a dilute aqueous solution of an alkali metal or alkaline earth metal hydroxide, oxide, carbonate or bicarbonate. Thus, the hydrolysis is satisfactorily effected by reacting the acidic steroid compound with an aqueous solution of potassium bicarbonate at 100° C. for about one-half hour.

The $\Delta^5$-3-ethylenedioxy-11,20-diketopregnene can then be hydrolyzed to 11-ketoprogesterone by treatment with acid. For example, the pregnene compound is hydrolyzed by reaction with a solution of perchloric acid in tetrahydrofuran at room temperature for two hours. After the hydrolysis is complete, the 11-keto progesterone is recovered by evaporating the reaction mixture to dryness under diminished pressure, extracting the residue with chloroform, and evaporating the chloroform extracts.

Thus, in accordance with the process of our invention, there is obtained from dl-$\Delta^5$-3-ethylenedioxy-11-keto-etienoylpyruvic acid, two isomeric forms of 11-keto progesterone. The one form of this product is identical with the product prepared from natural sources which is described in Helv. Chem. Acta. vol. 23, 684 and vol. 26, 721.

The following examples illustrate methods of carrying out our invention.

EXAMPLE 1

A. *Preparation of the strychnine salt of d-$\Delta^5$-3-ethylenedioxy-11-keto-etienoylpyruvic acid from dl-$\Delta^5$-3-ethylenedioxy-11-keto-etienoylpyruvic acid*

A mixture of 0.4445 g. of dl-$\Delta^5$-3-ethylenedioxy-11-keto-etienoylpyruvic acid and 0.3344 g. of strychnine was dissolved in 15 ml. boiling acetone. As the solution cooled it deposited crystals of the strychnine salt of dl-$\Delta^5$-3-ethylenedioxy-11-keto-etienoylpyruvic acid, M. P. 168–175° C. (dec.). The yield was 742 mg. (96%) in three crops. This salt was dissolved in 9 ml. of boiling ethyl acetate and allowed to cool, whereupon 300 mg. of the strychnine salt of d-$\Delta^5$-3-ethylenedioxy-11-keto-etienoylpyruvic acid crystallized out. This salt was collected on a filter, and after recrystallization from ethyl acetate had M. P. 215–216° C., $[\alpha]_D^{25}$ 0°±2 (1% solution in tetrahydrofuran), and was identical in every respect with a salt sample prepared from 11-keto progesterone obtained from natural sources.

B. *d-$\Delta^5$-3-ethylenedioxy-11-keto-etienoylpyruvic acid*

Three hundred milligrams of the strychnine salt of d-$\Delta^5$-3-ethylenedioxy-11-keto-etienoylpyruvic acid was suspended in 25 ml. of water containing 2.0 g. of sodium dihydrogen phosphate and 0.1 ml. of 5 N sulfuric acid. This mixture was extracted 5 times with ether over a half hour period, each ether extract being washed with water. The combined ether extracts were evaporated in vacuo without application of heat to give 167 mg. of d-$\Delta^5$-3-ethylenedioxy-11-keto-etienoylpyruvic acid, $[\alpha]_D^{25}$+46°±2 (1% solution in tetrahydrofuran).

C. *d-$\Delta^5$-3-ethylenedioxypregnene-11,20-dione*

A suspension of 165 mg. of d-$\Delta^5$-3-ethylenedioxy-11-keto-etienoylpyruvic acid in 10 ml. of 10% aqueous potassium bicarbonate was heated at 100° C. for ½ hour. The crystalline precipitate which formed was extracted into ether. Evaporation of the ether gave 74 mg. of crystalline residue which was adsorbed on 2 g. of acid-washed alumina. Elution with 1:1 petroleum ether-ether and evaporation of the eluant gave Δ⁵-3-ethylenedioxy-pregnene-11,20-dione, M. P. and mixed M. P. 175–176.5° C., $[\alpha]_D^{25}+53°$ (1% solution in chloroform) after recrystallization from benzene-petroleum ether and from ethyl acetate-petroleum ether.

D. d-11-keto progesterone

A solution of 1.0 ml. of 3 N perchloric acid was added to a solution of 40 mg. d-Δ⁵-3-ethylenedioxy-11,20-diketo pregnene [M. P. 175–176.5° C., $[\alpha]_D^{25}+53°$ (1% solution in chloroform)] in tetrahydrofuran. The reaction mixture was allowed to stand at room temperature for three and one half hours. The solvents were then removed in vacuo and the crude residue extracted with chloroform. The chloroform extract was dried over sodium sulfate and the solvent removed in vacuo. Recrystallization from ether yielded d-11-keto progesterone, M. P. and mixed M. P. 178° C., infrared (solid), identical with an authentic sample of 11-keto progesterone obtained from natural sources.

The starting material, dl-Δ⁵-3-ethylenedioxy-11-keto-etienoylpyruvic acid used in the foregoing example can be prepared as described in copending application Serial No. 310,133, filed September 17, 1952.

EXAMPLE 2

*Brucine salt of d-Δ⁵-3-ethylenedioxy-11-keto-etienoyl-pyruvic acid*

A mixture of 30 mg. of d-Δ⁵-3-ethylenedioxy-11-keto-etienoylpyruvic acid and 30 mg. of anhydrous brucine was dissolved in boiling acetone. Upon cooling the solution, 45 mg. of the brucine salt of d-Δ⁵-3-ethylenedioxy-11-keto-etienoylpyruvic acid crystallized out. After two recrystallizations from acetone, this salt had M. P. 175–180° C. (dec.) and $[\alpha]_D^{25}$ 0°±2 (1% solution in tetrahydrofuran).

EXAMPLE 3

*Strychnine salt of d-Δ⁵-3-ethylenedioxy-11-keto-etienoyl-pyruvic acid*

This was prepared in the same manner as the brucine salt, 30 mg. of d-Δ⁵-3-ethylenedioxy-11-keto-etienoylpyruvic acid and 23 mg. of strychnine yielding 32 mg. of the strychnine salt of d-Δ⁵-3-ethylenedioxy-11-keto-etienoylpyruvic acid. After recrystallization from ethyl acetate, this salt had M. P. 215–216° C., and $[\alpha]_D^{25}$ 0°±2 (1% solution in tetrahydrofuran).

EXAMPLE 4

*Ephedrine salt of d-Δ⁵-3-ethylenedioxy-11-keto-etienoyl-pyruvic acid*

This was prepared and purified in the same manner as the brucine salt, 30 mg. of d-Δ⁵-3-ethylenedioxy-11-keto-etienoylpyruvic acid and 12 mg. of anhydrous ephedrine yielding 25 mg. of ephedrine salt of Δ⁵-3-ethylenedioxy-11-keto-etienoylpyruvic acid, M. P. 190–195° C., $$[\alpha]_D^{25}+10°\pm2$$

(1% solution in tetrahydrofuran).

Various changes and modifications may be made in carrying out the present invention without departing from the spirit and scope thereof. Insofar as these changes and modifications are within the purview of the annexed claims, they are to be considered as part of our invention.

We claim:

1. An alkaloid salt of Δ⁵-3-ethylenedioxy-11-keto-etienoylpyruvic acid selected from the group consisting of the brucine, ephedrine and strychnine salts of Δ⁵-3-ethylenedioxy-11-keto-etienoylpyruvic acid having the structural formula

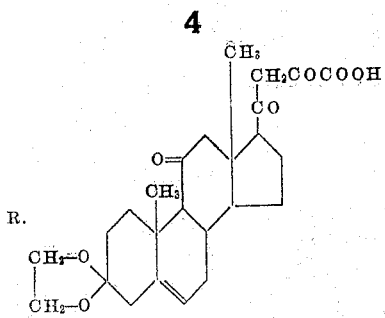

wherein R represents a member from the group consisting of brucine, ephedrine and strychnine.

2. The brucine salt of Δ⁵-3-ethylenedioxy-11-keto-etienoylpyruvic acid having the structural formula

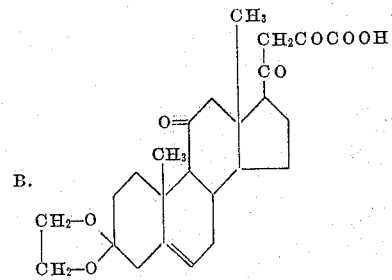

wherein B represents brucine.

3. The ephedrine salt of Δ⁵-3-ethylenedioxy-11-keto-etienoylpyruvic acid having the structural formula

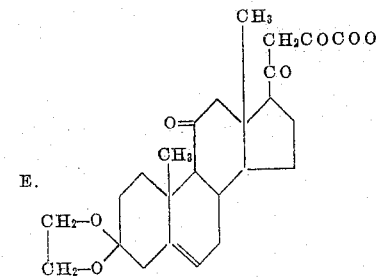

wherein E represents ephedrine.

4. The strychnine salt of Δ⁵-3-ethylenedioxy-11-keto-etienoylpyruvic acid having the structural formula

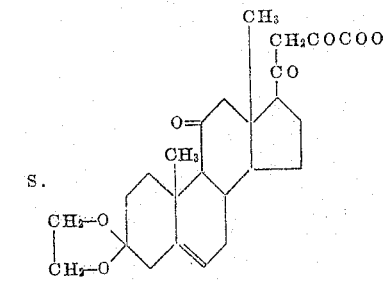

wherein S represents strychnine.

5. The strychnine salt of d-Δ⁵-3-ethylenedioxy-11-keto-etienoylpyruvic acid having the structural formula

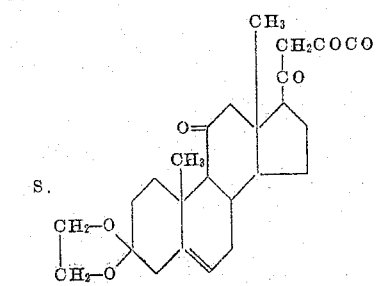

wherein S represents strychnine.

6. The strychnine salt of l-Δ⁵-3-ethylenedioxy-11-keto-etienoylpyruvic acid having the structural formula

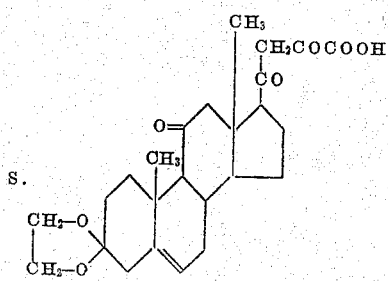

wherein S represents strychnine.

7. The process which comprises reacting dl-Δ⁵-3-ethylenedioxy-11-keto-etienoylpyruvic acid having the structural formula

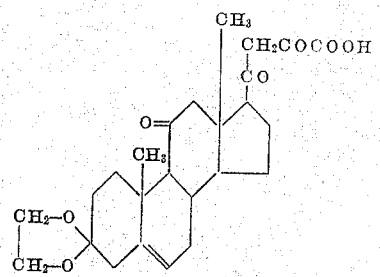

with an alkaloid from the group consisting of brucine, ephedrine and strychnine to form the corresponding alkaloid salts of the d and l isomeric forms of Δ⁵-3-ethylenedioxy-11-keto-etienoylpyruvic acid, and separating said isomeric salts by fractional crystallization.

8. The process which comprises reacting dl-Δ⁵-3-ethylenedioxy-11-keto-etienoylpyruvic acid having the structural formula

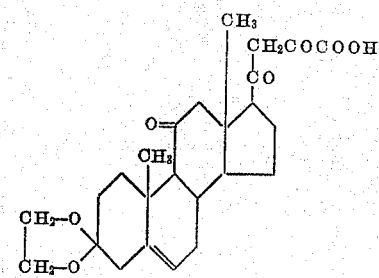

with strychnine to form the strychnine salts of the d and l isomeric forms of Δ⁵-3-ethylenedioxy-11-keto-etienoylpyruvic acid, and separating said isomeric salts by fractional crystallization.

9. The process which comprises reacting dl-Δ⁵-3-ethylenedioxy-11-keto-etienoylpyruvic acid having the structural formula

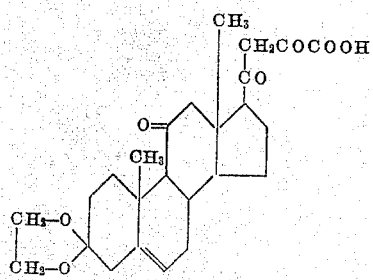

with strychnine to obtain a mixture of the strychnine salts of the d and l isomers of Δ⁵-3-ethylenedioxy-11-keto-etienoylpyruvic acid, dissolving said mixture of salts in ethyl acetate, and precipitating the alkaloid salt of the d isomer from the resulting solution.

10. The process which comprises reacting a salt of an alkaloid from the group consisting of brucine, ephedrine, and strychnine and Δ⁵-3-ethylenedioxy-11-keto-etienoylpyruvic acid with an acid, and recovering Δ⁵-3-ethylenedioxy-11-keto-etienoylpyruvic acid having the structural formula

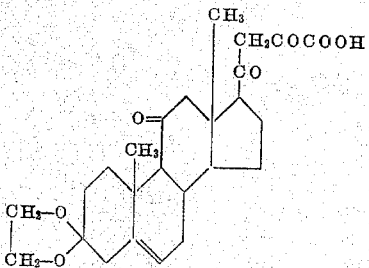

from the resulting reaction mixture.

11. The process which comprises reacting the strychnine salt of Δ⁵-3-ethylenedioxy-11-keto-etienoylpyruvic acid with an acid, and recovering Δ⁵-3-ethylenedioxy-11-keto-etienoylpyruvic acid having the structural formula

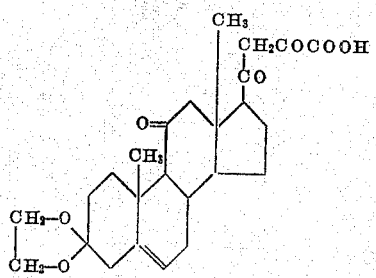

from the resulting reaction mixture.

No references cited.